(12) United States Patent
Worthy et al.

(10) Patent No.: US 7,263,946 B2
(45) Date of Patent: Sep. 4, 2007

(54) SYSTEM FOR MEASURING CHAIN OR ROPE DEPLOYMENT

(76) Inventors: Craig Worthy, 2127 San Antonio Dr., Alameda, CA (US) 94501; Mac Tarlton, 613 Haines Ct., Rapid City, SD (US) 57701

( * ) Notice: Subject to any disclaimer, the term of this patent is extended or adjusted under 35 U.S.C. 154(b) by 164 days.

(21) Appl. No.: 10/976,864

(22) Filed: Nov. 1, 2004

(65) Prior Publication Data

US 2006/0092034 A1 May 4, 2006

(51) Int. Cl.
*B63B 21/24* (2006.01)
(52) U.S. Cl. ...................................... 114/293
(58) Field of Classification Search ................. 114/293
See application file for complete search history.

(56) References Cited

U.S. PATENT DOCUMENTS

| | | | |
|---|---|---|---|
| 3,848,464 A | 11/1974 | Scheipner et al. | |
| 4,070,981 A | 1/1978 | Guinn et al. | |
| 4,789,136 A | 12/1988 | Connelly et al. | |
| 5,155,922 A | 10/1992 | Cooper | |
| 5,239,267 A | 8/1993 | Chemali et al. | |
| 5,427,323 A * | 6/1995 | Kaneko et al. | 242/223 |
| 5,803,008 A * | 9/1998 | Georgens et al. | 114/293 |
| 6,374,765 B1 * | 4/2002 | Marotta | 114/293 |
| 6,386,044 B1 | 5/2002 | Weinmann | |
| 6,557,630 B2 | 5/2003 | Harkins et al. | |

\* cited by examiner

*Primary Examiner*—Jesús D. Sotelo
(74) *Attorney, Agent, or Firm*—Cantor Colburn LLP

(57) ABSTRACT

A system for deploying a cable, such as a ship's anchor chain, wherein the chain is measured as it is deployed and the deployed length displayed on a visual display. The chain consists of links of a first composition, with indicator links of a second composition disbursed at regular intervals along the length of the chain. A sensor, such as a magnetometer or densimeter senses the difference between the links of the first composition and the indicator links of the second composition. A computer then multiplies the number of indicator links deployed by the regular interval to determine the length of deployed chain, which is then displayed on a display board which is located proximate the sensor or remotely. The linkage between the sensor and the display board may be either by wire or wireless connection. The system may be applied to a rope or continuous cable with equal effectiveness.

15 Claims, 4 Drawing Sheets

SYSTEM FOR MEASURING CHAIN OR ROPE DEPLOYMENT

BACKGROUND OF THE INVENTION

1. Field of the Invention

The present invention relates to an anchor chain system for a ship or smaller vessel. More particularly, the invention comprises a chain having certain links of a material dissimilar to the material of the other links, which are spaced at regular intervals along the length of the chain, for the electronic monitoring of the amount of chain deployed from a reel.

2. Description of the Prior Art

In the anchorage of ships or smaller vessels, it is desirable to know how much anchor chain has been deployed at any given time. Various methods have been employed over the years for anchoring and/or measuring the length of anchor chain deployed, including:

U.S. Pat. No. 5,155,922, issued to Cooper on Oct. 20, 1992, discloses a DEPTH MEASURING DEVICE WITH WEAR RESISTANT GUIDE MEANS wherein the length of cable deployed is measured by the number of rotations of a wheel mounted tangentially to the cable.

A MOORING SYSTEM FOR FLOATING DRILLING VESSELS is disclosed in U.S. Pat. No. 4,070,981, issued on Jan. 31, 1978, to Guinn, et al., in which the amount of anchor chain deployed is determined by a device which counts the links as the chain is deployed.

The above inventions and patents, taken either singly or in combination, is seen to describe the instant invention as claimed.

SUMMARY OF THE INVENTION

The present invention provides a system for electronically determining the amount of anchor chain, or the like, which has been deployed from a winch drum.

It is desirable for a ship or smaller vessel's crew to know at a glance, and often at a remote location, the amount of anchor chain which has been deployed from a winch drum.

The present invention provides a method of determining the amount of chain which has been deployed by detecting links of differing materials situated along the length of the chain at determined intervals. By detecting the number of links which have passed by or through a sensor and multiplying that number by the distance between the links, the length of chain deployed may be readily determined.

The sensor may be one which detects ferro-magnetic materials as opposed to non-ferro-magnetic, varying densities of materials, or any number of different detection methods known in the art. Likewise, detection could be similarly made of varying materials contained within a metal cable or rope, as well as links in a chain.

A read out of the information provided by the sensor could be situated at the sensor itself, or transmitted, either by wire or wireless signal, to a remote location.

Accordingly, it is a principal object of the invention to provide a method of determining the amount of anchor chain deployed.

It is another object of the invention to provide a method of determining the amount of anchor chain deployed by utilizing a chain having links of a material differing from the predominant material of the balance of the links of the chain.

It is a further object of the invention to provide a method of determining the amount of anchor chain deployed by determining the number of links of the differing material which have passed by or through a sensor.

Another object of the invention is to provide a method of determining the amount of anchor chain deployed wherein the information derived by the sensor may be read at the sensor.

Still another object of the invention is to provide a method of determining the amount of anchor chain deployed wherein the information derived by the sensor may be transmitted to a location remote from the sensor.

An additional object of the invention is to provide a method of determining the amount of anchor chain deployed wherein the sensor determines differing degrees of ferromagnetic properties within the differing links.

It is again an object of the invention to wherein the sensor determines differing density of the differing links.

Yet another object of the invention is to provide a method of determining the amount of anchor chain deployed wherein the chain is a continuous cable or rope having detectably differing materials disposed at determined intervals along its length.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
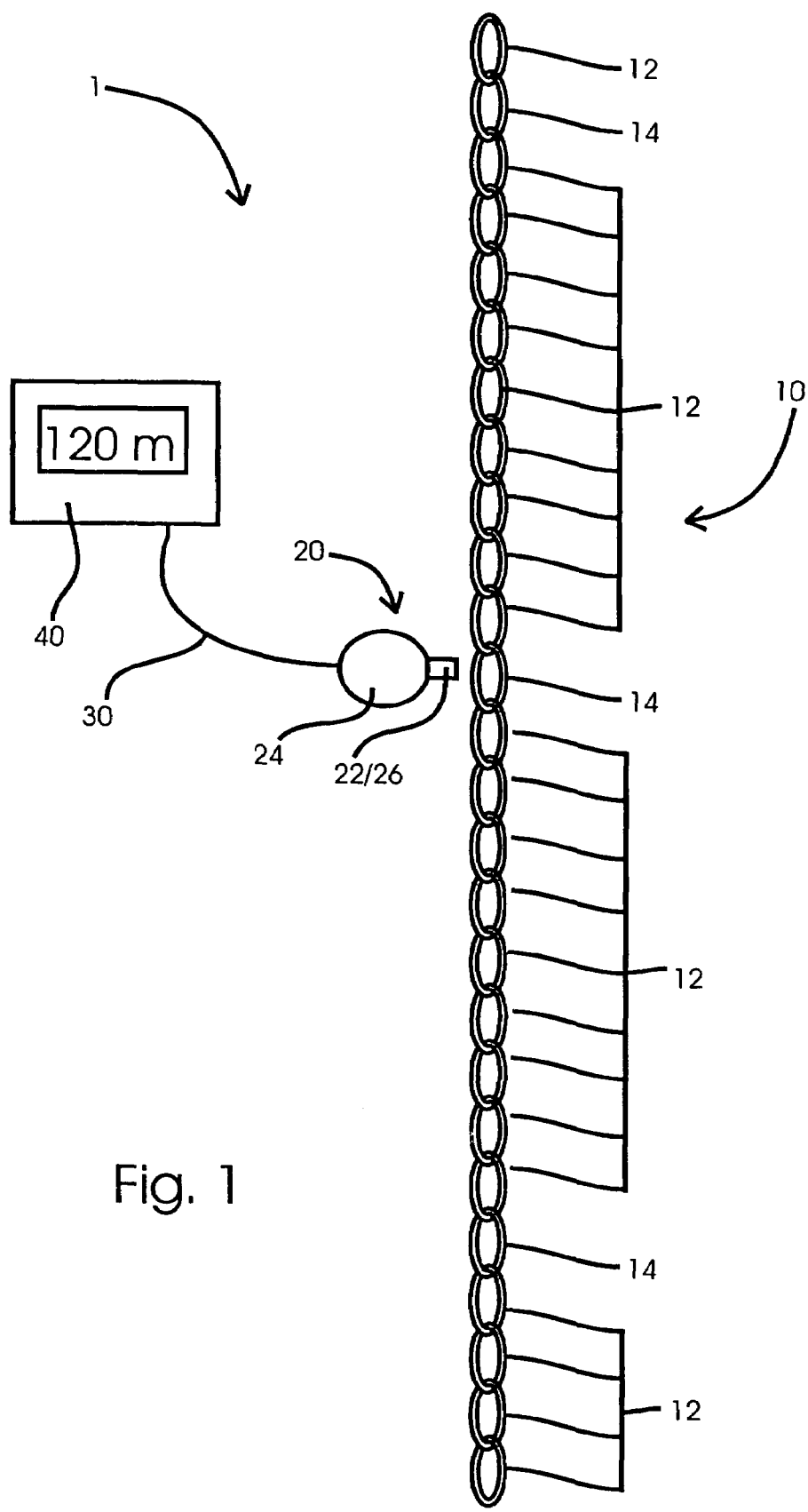
FIG. 1 is a diagrammatic sketch of the depth recording anchor chain system of the present invention with a wired connection between the sensor and the display.
Figure 2:
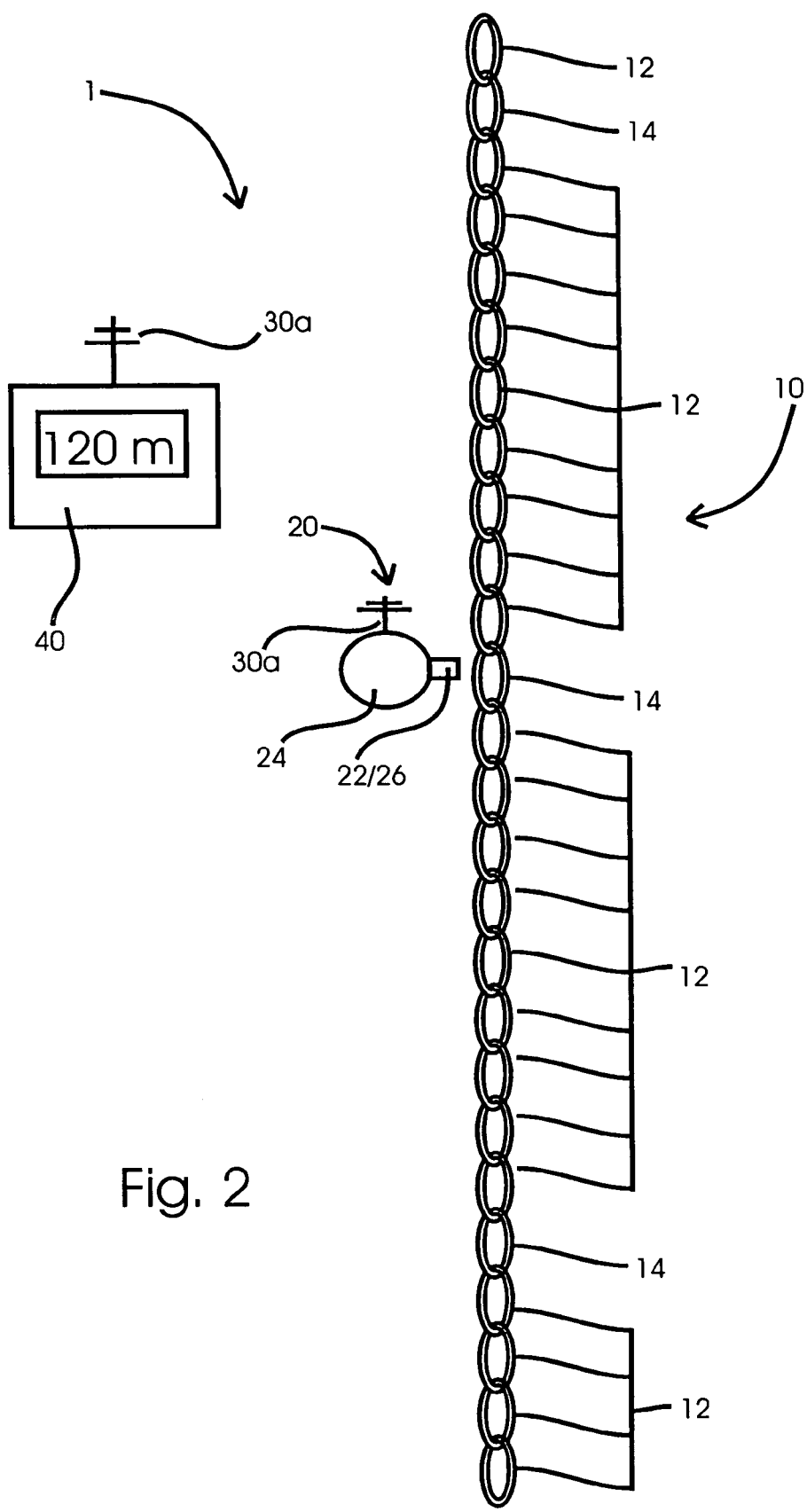
FIG. 2 is a diagrammatic sketch of the depth recording anchor chain system of the present invention with a wireless connection between the sensor and the display.

Referring to FIGS. 1 and 2, when reduced to its basic elements, the recording cable deployment system 1 of the present invention consists of a chain 10, a sensor 20, and a display terminal 40.

Chain 10 is typical of standard anchor chains, as are known in the art, fabricated with a plurality of links 12, which are of a first composition, such as a ferrous material. Disbursed at regular and determined intervals along the length of chain 10 are a plurality of indicator links 14, indicator links 14 being of a second composition differing from that of the links 12.

The sensor 20, which is situated at a point proximate the path of chain 10 as it is deployed, consists of a sensor head 22 and a computation device 24. The sensor 20 is connected to a display terminal 40, either by a cable 30 or wireless connection 30a. The computation device 24, display terminal 40 and cable 30/wireless connection 30a are all known in the art and are not deemed to be inventive in and of themselves, and therefore will not be described in great detail.

As in typical anchor systems, the chain 10 is stored on a winch drum (not shown) situated on deck or in the hold of a vessel and is deployed overboard to lower an anchor (not shown) to hold the vessel in a relatively fixed location. It is often desirable to know how much chain 10 has been deployed in order to determine how much remains on the winch drum, the water depth, or the lateral distance that the vessel has drifted from the point where the anchor has embedded itself. Ideally, the sensor 20 would be located proximate the point that the chain 10 is deployed from the winch drum (not shown), although it could be located at the point where the chain 10 goes overboard, or any point in between, with equal effectiveness, so long as the chain 10 is directed across the sensor 20.

The sensor head 22 may be of a variety of different types, including, but not limited to, a magnetometer, a densimeter, or a magnetic switch activated by the difference in magnetic attraction of the links 12 and sensing links 14. In the case of a magnetometer or densimeter, as the links 12 and indicating links 14 pass the sensor head 22, the difference in the magnetic attraction or density of the links 12 and indicator links 14 is detected and relayed to the computation device 24. In the case of a magnetic switch, the switch is opened/closed as the magnetic attraction changes as the links 12 and indicator links 14 pass.

Regardless of the type of sensor head 22 utilized, the reading of each indicator link 14 passing the sensor head 22 is relayed to the computation device 24 for computation and forwarding to the display terminal 40 for display, the computation consist of the number of indicator links 14 having passed the senor head 22 multiplied by the distance between the indicator links 14. It would be evident to one of ordinary skill in the art that the computation device 24 could be as simple as a device to multiply the counted links 14 by the interval to a broader computer system which performs other tasks, as well. It could, likewise, be a simple impulse which causes a mechanical or digital readout to advance in increments equal to the interval between links 14.

Simply counting the indicator links 14 as they pass the sensor head 22 does not give an accurate measure, as they are counted as the chain 10 is deployed and as it is retrieved back onto the winch drum. A motion sensor 26 employed in conjunction with the sensor head 22 senses the direction of travel of the chain 10, indicating to the computation device 24 whether to add to or subtract from the deployed length of the chain 10. It would be evident to one of ordinary skill in the art that a sensor (not shown) indicating direction of rotation of the winch drum (not shown) could accomplish the same without varying from the spirit of the present invention. It would, likewise, be evident to one of ordinary skill in the art that a reset button (not shown) could be employed to reset the computation device to zero at any desired time.

Figure 3:
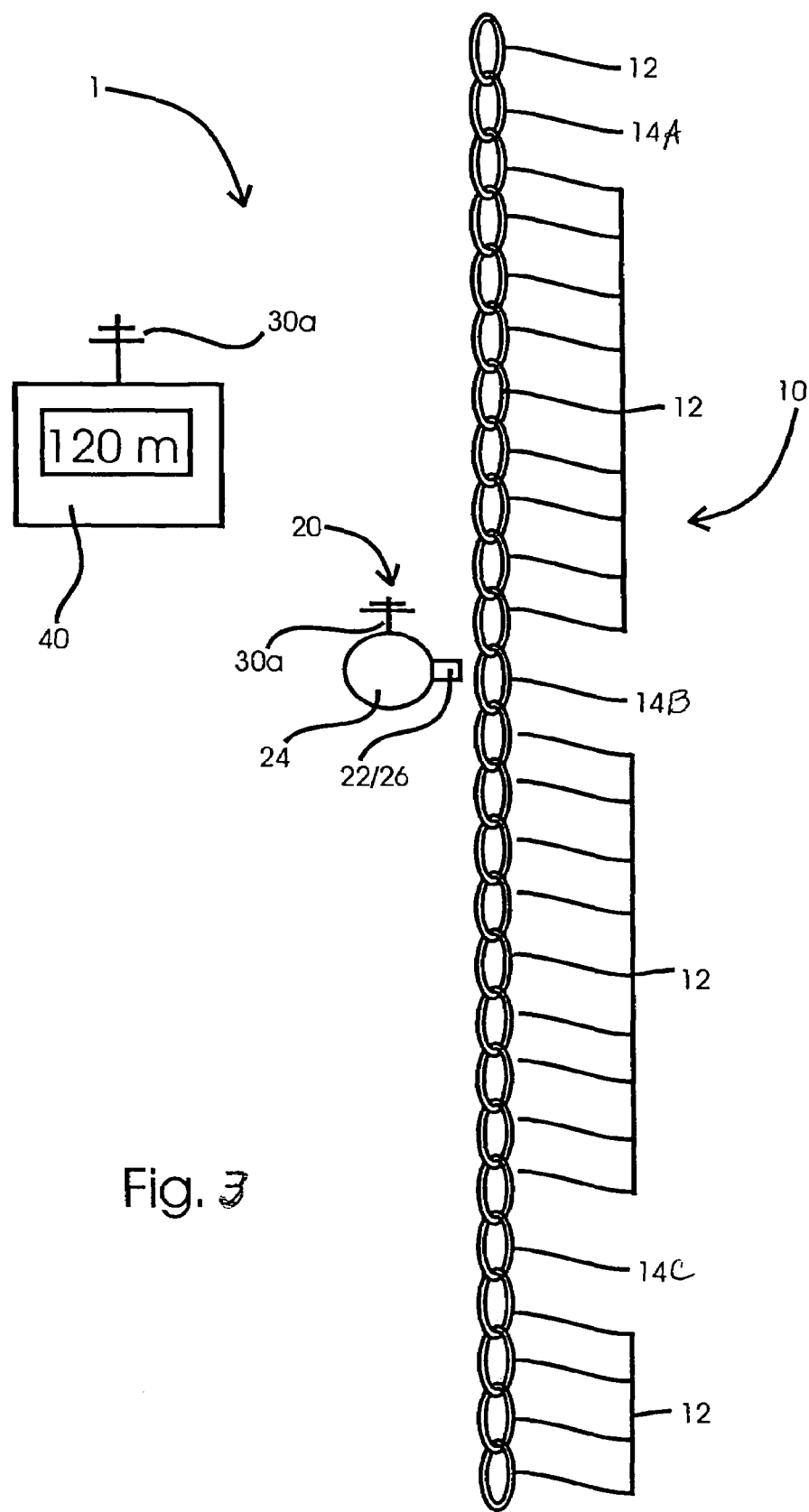
FIG. 3 is a diagrammatic sketch of the depth recording system of the present invention utilizing distinct composition for each indicator link or a unique Radio Frequency Identification (RFID) chip imbedded in each indicator link as a means of determining the amount of chain dispersed.

In lieu of indicator links 14, each being formed of the same material, the indicator links 14A, 14B, 14C, etc, (FIG. 3) could be formed such that each was of a composition unique unto itself and unlike each of the other indicator links 14 and the links 12. In such an embodiment, the sensor head 22 would determine the magnetic attraction or density of each unique indicator link 14A, 14B, 14C, etc, as it passed the sensor head 22 and the computation device 24 would determine translate that unique magnetic attraction or density to the corresponding depth figure and transmit that depth figure to the display device. Likewise, each unique indicator link 14A, 14B, 14C, etc, could be formed with a unique RFID chip imbedded therein and the sensor head 22 being an RFID receiver. Each unique RFID chip would be programmed to indicate the depth figure for that particular indicator link 14, which would be received by the RFID sensor head 22 and relayed to the display terminal 40.

Figure 4:
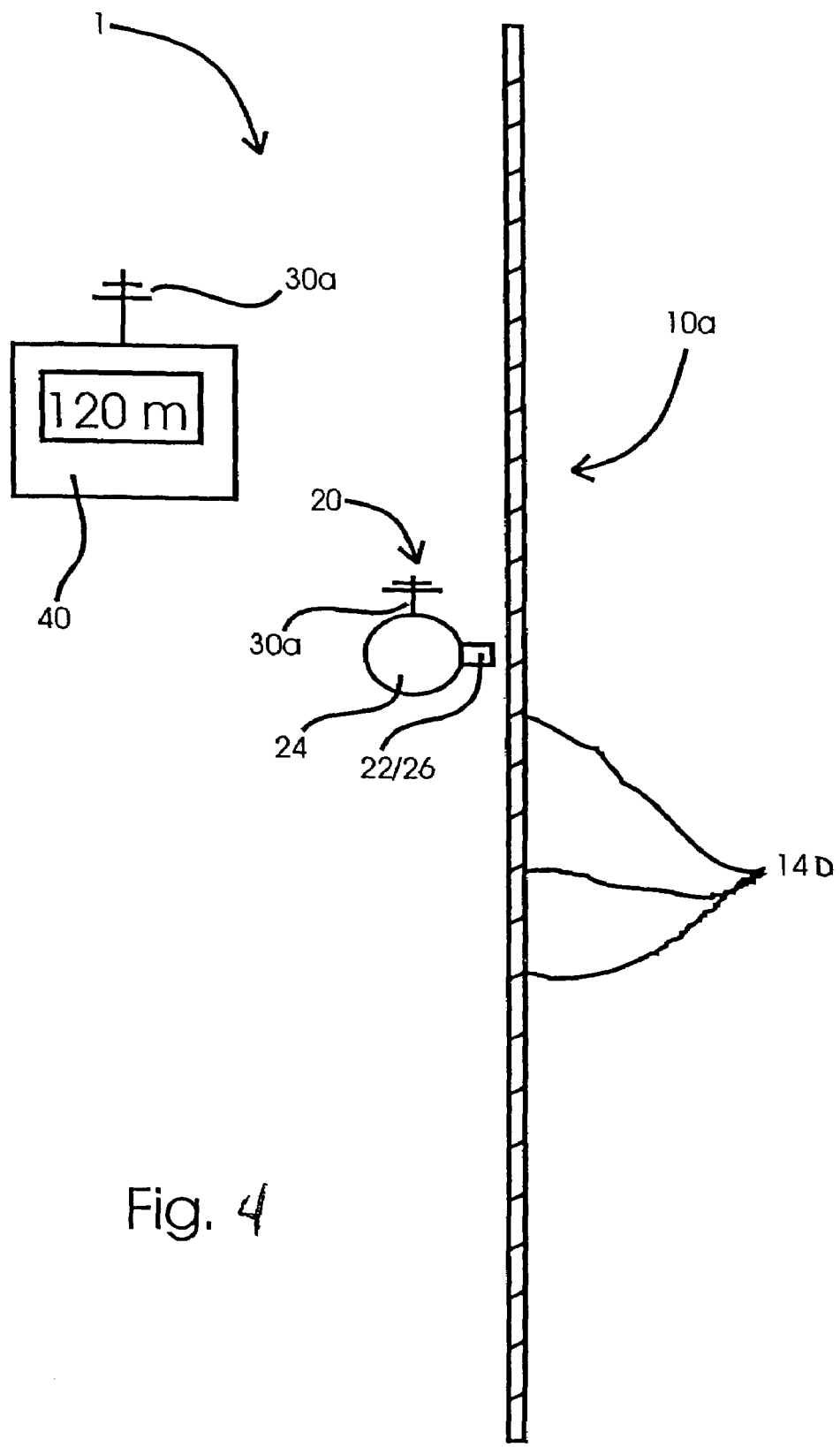
FIG. 4 is a diagrammatic sketch of the depth recording system of the present invention utilizing a continuous rope or cable in lieu of a linked chain.

While a chain 10 has been depicted and described herein above, it would be evident to one of ordinary skill in the art that the system could be applied to ropes or cables 10a having a continuous length, as opposed to the links 12/14 of chain 10, by including elements of a differing material 14D into the rope/cable 10a at regular, predetermined distances along the length thereof, as depicted at FIG. 4.

While the above has been related to use in the deployment and retrieval of an anchor, it would be evident to one of ordinary skill in the art that the present invention has equal applicability in any application wherein a continuous element is deployed and retrieved, such as cranes, tow lines, drag lines, etc.

It is to be understood that the present invention is not limited to the embodiments described above, but encompasses any and all embodiments within the scope of the following claims.

What is claimed is:

1. A system for measuring chain or rope deployment comprising:
    a cable comprising a chain, said chain comprising a plurality of links of a first composition,
    indicator elements positioned at regular intervals along the length of said cable, said indicator elements comprising a plurality of indicator links comprising a second composition, said second composition differing from that of said first composition, and said indicator links being disbursed at a regular, predetermined intervals along the length of said chain,
    sensing means for sensing the number of said indicator elements within said cable that have been deployed past the sensing means,
    computation means for computing the total length of said cable that has been deployed,
    display means for displaying the total length of said cable that has been deployed, and
    connecting means for connecting said computation means and said display means.

2. A system for measuring chain or rope deployment, as defined in claim 1, wherein at least one of said first composition and said second composition comprises a ferrous material and the magnetic attractivity of said first composition differs from the magnetic attractivity of said second composition.

3. A system for measuring chain or rope deployment, as defined in claim 2, wherein said sensing means comprises a magnetometer, said magnetometer reading said difference between said magnetic attractivity of said first composition and said second composition.

4. A system for measuring chain or rope deployment, as defined in claim 1, wherein the density of said first composition differs from the density of said second composition.

5. A system for measuring chain or rope deployment, as defined in claim 4, wherein said sensing means comprises a densimeter, said densimeter reading said difference between said density of said first composition and said density of said second composition.

6. A system for measuring chain or rope deployment, as defined in claim 1, wherein said computation means comprises a device which counts the number of said indicator links which have been sensed and multiplies this number by said regular, predetermined interval.

7. A system for measuring chain or rope deployment, as defined in claim 1, wherein said connection means comprises at least one of the group consisting of a wired connection and a wireless connection.

8. A system for measuring chain or rope deployment, as defined in claim 1, wherein said sensing means further comprises a motion sensor means for determining the direction of travel of said chain, said direction of travel determining whether said chain is being deployed or retrieved.

9. A system for measuring chain or rope deployment comprising:
- a cable, wherein said cable comprises a chain, said chain comprising a plurality of links of a first composition, and
- indicator elements positioned at regular intervals along the length of said cable, said indicator elements comprising a plurality of indicator links, each of said indicator links comprising a composition differing from that of said first composition and from each of the other said indicator links, and said indicator links being disbursed at a regular, predetermined intervals along the length of said chain
- sensing means for sensing the number of said indicator elements within said cable that have been deployed past the sensing means,
- computation means for computing the total length of said cable that has been deployed,
- display means for displaying the total length of said cable that has been deployed, and
- connecting means for connecting said computation means and said display means.

10. A system for measuring chain or rope deployment, as defined in claim 9, wherein said composition of each of said indicator links comprises a ferrous material and the magnetic attractivity of said each of said indicator links differs from that of said links of said first composition and from each of the other said indicator links.

11. A system for measuring chain or rope deployment, as defined in claim 10, wherein said sensing means comprises a magnetometer, said magnetometer reading said difference between said magnetic attractivity of said first composition and that of each of said indicator links.

12. A system for measuring chain or rope deployment, as defined in claim 9, wherein the density of said first composition and the density of each of the indicator links differs from one another, said sensing means comprises a densimeter, said densimeter reading said difference between said density of said first composition and that of each of said indicator links.

13. A system for measuring chain or rope deployment, comprising:
- a cable,
- indicator elements positioned at regular intervals along the length of said cable, said indicator elements comprising a plurality of unique RFID chips, each RFID chip being programmed with the respective length of deployed cable,
- sensing means for sensing the number of said indicator elements within said cable that have been deployed past the sensing means, said sensing means comprising an RFID receiver, said RFID receiver reading each unique RFID chip as it passes said RFID receiver
- computation means for computing the total length of said cable that has been deployed,
- display means for displaying the total length of said cable that has been deployed, and
- connecting means for connecting said computation means and said display means.

14. A system for measuring chain or rope deployment, as defined in claim 13, wherein said cable comprises a chain having links, and said plurality of unique RFID chips are attached to selected links of said chain.

15. A system for measuring chain or rope deployment, as defined in claim 13, wherein said cable comprises at least one of the group consisting of a continuous filament rope and a continuous filament metallic cable.

* * * * *